(12) United States Patent
Rahmati et al.

(10) Patent No.: US 11,216,923 B2
(45) Date of Patent: Jan. 4, 2022

(54) APPARATUS AND METHOD FOR SUCCESSIVE MULTI-FRAME IMAGE DENOISING

(71) Applicant: Samsung Electronics Co., Ltd., Gyeonggi-do (KR)

(72) Inventors: Mojtaba Rahmati, San Diego, CA (US); Dongwoon Bai, San Diego, CA (US); Jungwon Lee, San Diego, CA (US)

(73) Assignee: Samsung Electronics Co., Ltd.

( * ) Notice: Subject to any disclaimer, the term of this patent is extended or adjusted under 35 U.S.C. 154(b) by 70 days.

(21) Appl. No.: 16/380,473

(22) Filed: Apr. 10, 2019

(65) Prior Publication Data

US 2019/0362477 A1 Nov. 28, 2019

Related U.S. Application Data

(60) Provisional application No. 62/675,377, filed on May 23, 2018.

(51) Int. Cl.
*G06T 5/20* (2006.01)
*G06T 5/00* (2006.01)
*G06T 7/33* (2017.01)
*G06T 5/50* (2006.01)

(52) U.S. Cl.
CPC ............... *G06T 5/20* (2013.01); *G06T 5/002* (2013.01); *G06T 5/50* (2013.01); *G06T 7/337* (2017.01); *G06T 2207/20224* (2013.01)

(58) Field of Classification Search
CPC .......... G06T 5/002; G06T 7/337; G06T 5/50; G06T 2207/20224; G06T 2207/20024; G06T 2207/20021
See application file for complete search history.

(56) References Cited

U.S. PATENT DOCUMENTS

| | | | |
|---|---|---|---|
| 8,483,510 B2 | 7/2013 | Murashita et al. | |
| 8,964,060 B2 | 2/2015 | Levoy et al. | |
| 9,047,684 B2 | 6/2015 | Lelescu et al. | |
| 9,449,374 B2 | 9/2016 | Nash et al. | |
| 9,762,893 B2 | 9/2017 | Barron et al. | |
| 9,998,666 B2 | 6/2018 | Sapiro et al. | |
| 2013/0022285 A1* | 1/2013 | Suzuki | H04N 19/18 382/233 |
| 2014/0093180 A1* | 4/2014 | Esenlik | H04N 19/423 382/233 |

OTHER PUBLICATIONS

Samuel W. Hasinoff, et al. "Burst photography for high dynamic range and low-light imaging on mobile cameras", ACM Transactions of Graphics, TOG, 2016, pp. 1-12.

(Continued)

*Primary Examiner* — Jianxun Yang
(74) *Attorney, Agent, or Firm* — The Farrell Law Firm, P.C.

(57) ABSTRACT

An apparatus and method for successive multi-frame image denoising are herein disclosed. According to one embodiment, an apparatus includes a Wiener filter configured to filter a frame of an image; and a frame delayer configured to feedback the filtered frame to the Wiener filter, wherein the Wiener filter is further configured to filter a subsequent frame of the image based on the filtered frame.

14 Claims, 11 Drawing Sheets

(56) References Cited

OTHER PUBLICATIONS

Patrick Wieschollek, et al. "End-to-End Learning for Image Burst Deblurring", https://arxiv.org/pdf/1607.04433.pdf, Sep. 6, 2016, pp. 1-17.
Kostadin Dabov, et al. "Image denoising with block-matching and 3D filtering", http://citeseerx.ist.psu.edu/viewdoc/download?doi=10.1.1.300.5214&rep=rep1&type=pdf Feb. 17, 2006, pp. 1-12.

\* cited by examiner

APPARATUS AND METHOD FOR SUCCESSIVE MULTI-FRAME IMAGE DENOISING

PRIORITY

This application claims priority under 35 U.S.C. § 119(e) to a U.S. Provisional Patent Applications filed on May 23, 2018 in the United States Patent and Trademark Office and assigned Ser. No. 62/675,377, the entire contents of which are incorporated herein by reference.

FIELD

The present disclosure relates generally to image processing, and more particularly, to an apparatus and method for successive multi-frame denoising.

BACKGROUND

Digital photography under low light conditions may be a challenging task where a long exposure time (to collect more light) causes motion blur and a short exposure time (to avoid motion blur) increases the noise level. To overcome such challenges, a typical method is to use burst photography and fuse the multiple frames to generate a sharp low-noise image. Multi-frame fusion, however, requires two major steps: registration to align the image frames (accounting for both global and local motion) and multi-frame merging (fusion) to enhance the quality.

SUMMARY

According to one embodiment, an apparatus is provided. The apparatus includes a Wiener filter configured to filter a frame of an image; and a frame delayer configured to feedback the filtered frame to the Wiener filter, wherein the Wiener filter is further configured to filter a subsequent frame of the image based on the filtered frame.

According to one embodiment, an apparatus is provided. The apparatus includes a first subtractor including a first input to receive a frame of the image, a second input to receive a reference frame, and an output; an absolute value function block including an input connected to the output of the first subtractor and an output; a second subtractor including a first input connected to the output of the absolute value function block, a second input for receiving a first predetermined value, and an output; and a maximum value divider function block including an input connected to the output of the second subtractor and an output for outputting filter weights.

According to one embodiment, a method is provided. The method includes filtering, by a Wiener filter, a frame of an image; and feeding back, by a frame delayer, the filtered frame to the Wiener filter; and filtering, by the Wiener filter, a subsequent frame of the image based on the filtered frame.

According to one embodiment, a method is provided. The method includes subtracting, by a first subtractor, a reference from a frame of an image; determining, by an absolute value function block, an absolute value of an output of the first subtractor; subtracting, by a second subtractor, a first predetermined value from an output of the absolute value function block; and determining, by a maximum value divider function block, a maximum value divider of an output of the second subtractor.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
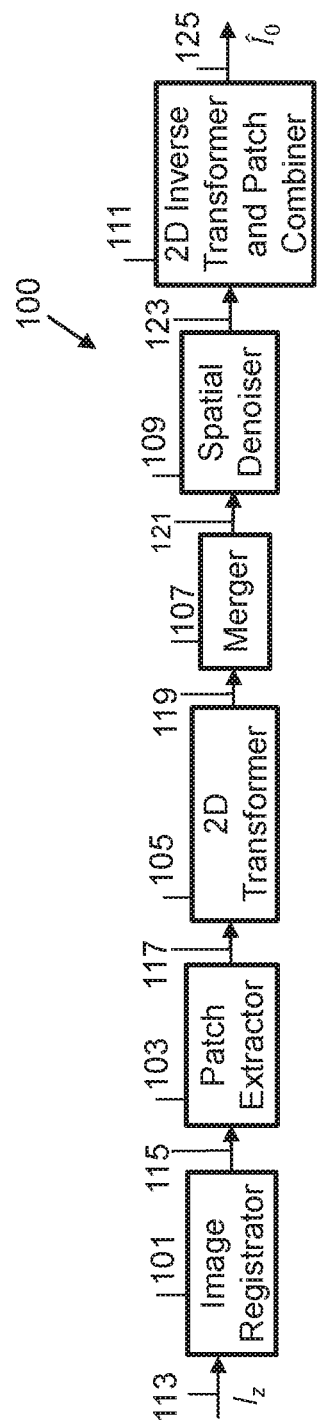
FIG. 1 is a block diagram of an apparatus for providing multi-frame denoising, according to one embodiment.

Hereinafter, embodiments of the present disclosure are described in detail with reference to the accompanying drawings. The same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure.

In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, the present disclosure is not limited to the embodiments, but includes all modifications, equivalents, and non-references within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element.

As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

According to one embodiment, an apparatus and method provides multi-frame denoising also referred to as successive pairwise 3D merging where a less noisy image is created with merging a burst of noisy images. This reduces noise and is robust to residual alignment error (due to residual error in compensating both camera and scene motions).

Some level of alignment may already exist among the frames and focus may be on a multi frame merging step. Furthermore, image frames may be aligned with some level of residual alignment error and artificial alignment errors may be introduced to evaluate the merging schemes in the presence of alignment error.

In one embodiment, an apparatus selects one frame as a reference frame (either pre-determined or selected dynamically) and divides all frames into small patches. The apparatus orders aligned non-reference patches across the burst based on their similarity with the corresponding reference patch, and successively merges the ordered patches in transform domain (e.g., discrete Fourier transform (DFT)). The apparatus performs the merging successively (one patch at a time), where the non-reference patches that are more similar to the reference patch are merged first. The apparatus merges each non-reference patch with the most recently merged result) initialized with a reference patch in a 3D domain by applying Wiener filtering over 3D transform domain components, which improves peak signal to noise ratio (PSNR) and structural similarity (SSIM) over synthetically generated noisy burst. The apparatus and method performs better than other typical methods including robust merging and V-BM4D.

In an embodiment, a robust merging method provides that exposure is constant over all frames in a burst, which makes alignment more robust (there is no noise level difference between different frames of the burst). Second, raw Bayer images are merged rather than demosaiced red green blue (RGB) (or luminance (Y) and chrominance (U and V) (YUV)) frames, which provides the benefit of both increased dynamic range and a simple noise model. Third, an FFT-based alignment algorithm and a hybrid two dimensional (2D)/3D Wiener filter is used to denoise and merge frames in a burst.

In an embodiment, both alignment and merging are performed per tile. The merging method is based on a pairwise frequency-domain temporal filter operating on the tiles of the input. Each tile in the reference is merged with one tile taken from each of the non-reference frames. 16×16 tiles are typically used from color planes of Bayer raw input, but for very dark scenes, for which low-frequency noise can be objectionable, 32×32 tiles are used.

In robust merging, each plane of the Bayer image is independently merged. Below, a merging method is disclosed in terms of single-channel images which may be simply extended to the case of Bayer images where each plane is merged independently.

The robust merging method operates on image tiles in the spatial frequency domain. For a given reference tile, a set of corresponding tiles are assembled across the burst, one per frame, and their respective 2D DFTs are computed as $T_z(w)$, where $w=(w_x, w_y)$ denotes spatial frequency, z is the frame index, and, without loss of generality, frame 0 is taken to be the reference.

Robust merging applies frequency domain merging in Equations (1) as follows:

$$\tilde{T}_0(w) = \frac{1}{N}\sum_{z=0}^{N-1}[T_z(w) + A_z(w)(T_0(w) - T_z(w))] = \qquad (1)$$

$$\frac{1}{N}\sum_{z=0}^{N-1}\left[T_z(w) + \frac{|D_z(w)|^2}{|D_z(w)|^2 + c\sigma^2}D_z(w)\right]$$

$A_z$ is a shrinkage operator that is defined as a variant of the Wiener filter in Equation (2) as follows:

$$A_z(w) = \frac{|D_z(w)|^2}{|D_z(w)|^2 + c\sigma^2} \qquad (2)$$

where $D_z(w)=T_0(w)-T_z(w)$, $\sigma^2$ denotes the noise variance, and c is a design parameter that increases noise reduction at the expense of some robustness.

The above pairwise temporal filter does not perform any spatial filtering, so a spatial filtering is applied as a separate post-processing step in the 2D DFT domain. Spatial filtering is performed by applying a pointwise shrinkage operator of the same form as Equation (2) above to the spatial frequency coefficients, assuming that all N frames are averaged perfectly and the estimated noise variance is updated as $\sigma^2/N$. An additional noise shaping filter in the form of $\tilde{\sigma}=f(w)\sigma$ is also applied. In summary, the spatial filtering of robust merging is in the form of Equation (3) as follows:

$$\hat{T}_0(w) = \frac{|\tilde{T}(w)|^2}{|\tilde{T}(w)|^2 + c\frac{f(w)\sigma^2}{N}}\tilde{T}(w) \qquad (3)$$

Robust merging operates on tiles overlapped by half in each spatial dimension. By smoothly blending between overlapped tiles, visually objectionable discontinuities may be avoided at tile boundaries. Additionally, a window function is applied to the tiles to avoid edge artifacts when operating in the DFT domain. A modified raised cosine window is used, ½−½ cos(2π(x+½)/n) for x<n, and 0 otherwise.

According to one embodiment, the present apparatus and method provides successive robust merging as a modified version of the robust merging method described above. In robust merging, the goal is to reject merging of a non-reference frame whenever the difference between the corresponding non-reference frame and the reference frame ($D_z(w)=T_0(w)-T_z(w)$) cannot be related to the noise.

In robust merging, non-reference frames are independently merged with a reference frame. $\hat{R}_M$ may be defined as the merging result after merging (M−1)-th non-reference frame. Therefore, $\hat{R}_N(w)=\tilde{T}_0(w)$ (as defined in Equation (1) above and the Equation (4) as follows) represents intermediate merging results of Equation (1) above:

$$\hat{R}_M(w) = \begin{cases} T_0(w) & M = 1 \\ \dfrac{1}{M}\displaystyle\sum_{z=0}^{M-1}\left[T_z(w) + \dfrac{|D_z(w)|^2}{|D_z(w)|^2 + c\sigma^2}D_z(w)\right] & M > 1 \end{cases} \quad (4)$$

The goal of merging is to reduce the noise level, hence it is expected to observe lower level of noise in $\hat{R}_M$ for M>1 in compare with $T_0$. Assuming perfect alignment up to M-th frame, all frames are averaged perfectly and the noise level is reduced by $$\frac{1}{M}$$

after merging M frames. If there is access to the true noise-free image of the scene R, a better merging strategy is to obtain $D_z(w)=R(w)-T_z(w)$ as opposed to $D_z(w)=T_0(w)-T_z(w)$ and reject merging the z-th non-reference frame whenever its difference with respect to the true image R cannot be related to the noise. Typically, there is no access to the true image R; however, after merging M frames there is access to $\hat{R}_M$ as an estimate of R.

Therefore, an apparatus according to one embodiment may use $\hat{R}_M$ in determining merging level of $T_M$ ((M+1)-th frame. Frame indexing starts from 0, assuming that $\hat{R}_z$ experiences noise level of $$\frac{\sigma^2}{z}.$$

This scheme may be referred to as successive robust merging, which may be formulated as in Equation (5) as follows:

$$\hat{R}_M(w) = \begin{cases} T_0(w) & M = 1 \\ \dfrac{1}{M}\displaystyle\sum_{z=0}^{M-1} T_z(w) + \dfrac{|D_z^S(w)|^2}{|D_z^S(w)|^2 + c\dfrac{\sigma^2\left(1+\frac{1}{z}\right)}{2}}D_z^S(w) & M > 1 \end{cases} \quad (5)$$

where $D_z^S(w)=\hat{R}_z(w)-T_z(w)$. Equation (5) may be equivalently written as Equation (6) as follows:

$$\hat{R}_M(w) = \begin{cases} T_0(w) & M = 1 \\ \dfrac{1}{M}\left((M-1)\hat{R}_{M-1}(w) + \dfrac{|D_{M-1}^S(w)|^2}{|D_{M-1}^S(w)|^2 + c\dfrac{\sigma^2\left(1+\frac{1}{M-1}\right)}{2}}D_{M-1}^S(w)\right) & M > 1 \end{cases} \quad (6)$$

According to one embodiment, an apparatus and a method provides differential successive robust merging, where $\hat{R}_M(w)$ is only used to update $A_z(w)$'s which arrives at Equation (7) as follows:

$$\hat{R}_M(w) = \begin{cases} T_0(w) & M = 1 \\ \dfrac{1}{M}\displaystyle\sum_{z=0}^{M-1}\left[T_z(w) + \dfrac{|D_z^S(w)|^2}{|D_z^S(w)|^2 + c\dfrac{\sigma^2\left(1+\frac{1}{z}\right)}{2}}D_z(w)\right] & M > 1 \end{cases} \quad (7)$$

where $D_z^s(w)=\hat{R}_z(w)-T_z(w)$ and $D_z(w)=T_0(w)-T_z(w)$ and the following may be equivalently written as Equation (8) as follows:

$$\hat{R}_M(w) = \begin{cases} T_0(w) & M = 1 \\ \dfrac{1}{M}\left((M-1)\hat{R}_{M-1}(w) + \dfrac{|D_{M-1}^S(w)|^2}{|D_{M-1}^S(w)|^2 + c\dfrac{\sigma^2\left(1+\frac{1}{M-1}\right)}{2}}D_{M-1}(w)\right) & M > 1 \end{cases} \quad (8)$$

According to one embodiment, a burst of N noisy images with $I_k(x,y)$ denotes the k-th image frame $k \in \{0, \ldots, N-1\}$ and (x,y) denotes the 2D spatial pixel position. Patches are overlapped by half in each spatial dimension with size of 16×16 and filtered using a modified raised cosine window, ½−½ cos (2π(x+½)/n) for x<n, and 0 otherwise. A two-dimensional-discrete Fourier transform (2D-DFT) of a considered patch (weighted by the aforementioned raised cosine window) of the k-th frame is denoted as $F_k(w)$, where $w=(w_x, w_y)$, denotes 2D spatial frequency and the patch index is dropped for the sake of simplicity.

According to one embodiment, an apparatus and method provides multi-frame merging in particular, successive pairwise 3D merging. Residual alignment error may exist among the frames. In successive pairwise 3D merging, the present apparatus successively merges non-reference frames where each non-reference frame is merged with the most recent merged result (initialized with a reference patch). The aligned non-reference patches across the burst are ordered based on their similarity with the corresponding reference patch, then successively merged in a transform domain. The apparatus performs merging successively (one patch at a time), where the non-reference patches more similar to the reference patch are merged first. The apparatus performs merging in a transform domain using a two-step transformation.

In a first step transformation, the present apparatus obtains two-dimensional transformation (e.g., discrete Fourier transforms 2D-DFTs) of the reference and non-reference frames. In a second step transformation, the present apparatus performs a simple 2 point one-dimensional-DFT (1D-DFT) in temporal direction over the pair of aligned frequency components of the most recent merged results and the available non-reference frame.

The apparatus applies Wiener filtering over the 3D transformation results, then converts the filtered 3D transformation results back to 2D domain (simple 2 point inverse DFT) to update the most recent merged results. The apparatus initializes the merging with Wiener filtering of the reference frame in 2D transform domain. For example, the successive pairwise merging scheme may be formulated as in Equations (9) and (10) as follows:

$$\hat{R}_M(w) = \begin{cases} \dfrac{|T_0(w)|^2}{|T_0(w)|^2 + c\sigma^2} T_0(w) & M = 1 \\ \dfrac{1}{2}\left(G_M^+\left(\hat{R}_{M-1}(w) + T_{M-1}(w)\right) + G_M^-\left(\hat{R}_{M-1}(w) - T_{M-1}(w)\right)\right) & M > 1 \end{cases} \quad (9)$$

$$\hat{R}_M(w) = \begin{cases} F_0(w) & M = 1 \\ \dfrac{G_M^+\left(\hat{R}_{M-1}(w) + F_{M-1}(w)\right) + G_M^-\left(\hat{R}_{M-1}(w) - F_{M-1}(w)\right)}{2} & M > 1 \end{cases} \quad (10)$$

where $\hat{R}_M$ represent the most recent merge result after merging M frames (merging M−1 non-reference frames to the reference frame), and Equations (11) and (12) are as follows:

$$G_M^+(w) = \dfrac{\left|\hat{R}_{M-1}(w) + T_{M-1}(w)\right|^2}{\left|\hat{R}_{M-1}(w) + T_{M-1}(w)\right|^2 + c(\sigma_{M-1}^2 + \sigma^2)} \quad (11)$$

$$G_M^-(w) = \dfrac{\left|\hat{R}_{M-1}(w) + T_{M-1}(w)\right|^2}{\left|\hat{R}_{M-1}(w) - T_{M-1}(w)\right|^2 + c(\sigma_{M-1}^2 + \sigma^2)} \quad (12)$$

where $\sigma_M^2 = \frac{1}{4}[(G_{M-1}^+(w) + G_{M-1}^-(w))^2 \sigma_{M-1}^2 - G_{M-1}^+(w))^2 \sigma^2]$ with $\sigma_0^2 = \sigma^2$.

In successive merging, the order of the merging may impact the quality of the final merging results. Different metrics may be used in ordering the frames, for example, sharpness (sharpest frames selected as the reference and the sharper frames are merged first) or matching score of the non-reference frames with respect to the reference frame where the frames with higher matching score are merged first.

According to one embodiment, the apparatus provides merging based on an MMSE estimation principle in the frequency domain. A motivation in considering MMSE estimation in frequency domain (instead of spatial domain) is the sparsity property of the natural images in frequency domain enabling us to obtain MMSE estimation independently per frequency component. The apparatus applies MMSE estimation in a transform domain (frequency domain) that considers each frequency component independently.

As described above in reference to the robust merging method, overlapped patches are merged in the frequency domain, where $T_z(w)$ is defined as a frequency domain representation of the z-th frame tile and $w = (w_x, w_y)$ denotes spatial frequency.

R is defined as the true signal (e.g., the original noise free image of the scene), $T_0(w)$ is considered as the noisy reference frame and $I_z(w)$ is defined as an alignment error at z-th frame with respect to the reference frame, i.e., $I_0(w) = 0$. For noisy and potentially misaligned block of the z-th non-reference frame $T_z(w)$, Equation (13) is as follows:

$$T_z(w) = R(w) + I_z(w) + N(w) \quad (13)$$

where R is the true image and $N_z(w)$ is independent and identically distributed (i.i.d.) zero mean Gaussian noise with variance $\sigma_z^2$; $T_0(w) = R(w) + N_0(w)$.

According to one embodiment, the apparatus performs merging as an estimation problem with the goal of estimating the image R out of N observations $T_z(w)$'s. For $I_0(w) = 0$, frame $T_0$ acts as the reference frame. Considering a burst of N frames, and for a given spatial frequency w, a vector $T(w) = [T_0(w), T_1(w), \ldots, T_{N-1}(w)]^T$ is formed that may be formulated as in Equation (14) as follows:

$$T(w) = \begin{bmatrix} T_0(w) \\ T_1(w) \\ \vdots \\ T_{N-1}(w) \end{bmatrix} = \begin{bmatrix} 1 \\ 1 \\ \vdots \\ 1 \end{bmatrix} R(w) + \begin{bmatrix} 0 \\ I_1(w) \\ \vdots \\ I_{N-1}(w) \end{bmatrix} + N(w) \quad (14)$$

If $\mu(w) = E\{R(w)\}$ and $P(w)$ as true image power at spatial frequency w, i.e., $P(w) = E\{|R(w) - \mu(w)|^2\}$ and $I_z(w)$'s are i.i.d. Gaussian variables with $E\{I_z(w)\} = 0$, for MMSE estimation of $R(w)$, Equation (15) is as follows:

$$\hat{R}(w) = \mu(w) + P(w)[1 \ 1 \ \ldots \ 1] \quad (15)$$

$$\left(P(w)\begin{bmatrix}1\\1\\\vdots\\1\end{bmatrix}[1 \ 1 \ \ldots \ 1] + \begin{bmatrix}\sigma_0^2 & 0 & \ldots & 0\\0 & \sigma_1^2 + E\{|I_1(w)|^2\} & \ldots & 0\\\vdots & \vdots & \ddots & \vdots\\0 & 0 & \ldots & \sigma_{N-1}^2 + E\{|I_{N-1}(w)|^2\}\end{bmatrix}\right)^{-1}$$

$$(T(w) - \mu(w)1_N)$$

From Equation (15), Equation (16) may be obtained as follows:

$$\hat{R}_{MMSE}(w) = \quad (16)$$

$$\mu(w) + \frac{1}{1 + \sum_{z=0}^{N-1}\frac{P(w)}{\sigma_z^2 + E\{|I_z(w)|^2\}}} \sum_{z=0}^{N-1}\frac{P(w)}{\sigma_z^2 + E\{|I_z(w)|^2\}}(T_z(w) - \mu(w))$$

To obtain the MMSE results, $\sigma + E\{|I_z(w)|^2\}$ and P(w) are required which are unknown. For $\sigma_z^2 + E\{|I_z(w)|^2\}$, the instantaneous power may be used, i.e., as in Equation (17) as follows:

$$\{|I_z(w)|^2\} + \sigma_z^2 = \sigma_z^2 + \max(0, |T_z(w) - T_0(w)|^2 - \sigma_0^2 - \sigma_z^2) \quad (17)$$

For P(w), since there is access to multiple frames, P(w) may be determined as in Equation (18) as follows:

$$P(w) = \frac{1}{N}\sum_{z=0}^{N-1}\max(0, |T_z(w) - \mu(w)|^2 - (E\{|I_z(w)|^2\} + \sigma_z^2)). \quad (18)$$

Since $E\{\hat{R}(w)|R(w)\} \neq R(w)$, the above estimator is biased. Therefore, an unbiased MMSE estimate of R(w) may be obtained as in Equation (19) as follows:

$$\hat{R}_{UMMSE}(w) = \frac{1}{\sum_{z=0}^{N-1}\frac{1}{\sigma_z^2 + E\{|I_z(w)|^2\}}} \sum_{z=0}^{N-1}\frac{1}{\sigma_z^2 + E\{|I_z(w)|^2\}}T_z(w) \quad (19)$$

where only an estimate of $E\{|I_z(w)|^2\} + \sigma_z^2$ is needed to obtain $\hat{R}_{UMMSE}(w)$.

$\mu(w) = E\{R(w)\}$ is also needed in the above calculations. $\mu(w)$ may be calculated in terms of the mean of the patch in spatial domain. By defining J(x,y) as image intensity at (x,y) spatial location, and assuming $E\{J(x,y)\} = u$, Equation (20) is obtained as follows:

$$\mu(w) = E\{DFT(G.*J)\} = \quad (20)$$

$$\frac{1}{M}\sum_{z=0}^{M-1}\sum_{z=0}^{M-1}G(x,y)E\{J(x,y)\}e^{-\frac{2\pi j(w_x x + w_y y)}{M}} = uDFT(G)$$

where G represents the windowing matrix and ".*" represents element wise matrix multiplication.

In the present disclosure, five sets of multi-frame denoising apparatuses and methods are described (i.e., successive robust merging (which is combined with robust merging), difference successive robust merging, successive pairwise 3D merging (which applies a pairwise Wiener filtering in a 3D transform domain), MMSE merging, and unbiased MMSE merging).

A burst of N noisy images with $I_k(x,y)$ denoting the k-th image frame, $k \in (0, \ldots, N-1)$ and (x,y) denoting the 2D spatial pixel position are considered. For notational convenience, the color channel index is omitted. However, the present disclosure may include color channels.

M×M image patches are extracted and a 2D transformation (e.g., 2D-DFT or 2D wavelet) is applied over the patches and the image patch in a transform domain is denoted as $F_k(w_x, w_y)$ where $w = (w_x, w_y)$ denotes 2D spatial frequency. For example, image patches may be selected by half overlap in each spatial dimension with size of M×M and filtered using a modified raised cosine window, ½−½ cos $(2\pi(x+½)/n)$ for x<n, and 0 otherwise.

In an embodiment, some level of alignment is obtained among the frames, where the focus is on multi frame merging in the presence of residual alignment error.

FIG. 1 is a block diagram of an exemplary apparatus 100 for providing multi-frame image denoising, according to one embodiment.

Referring to FIG. 1, the apparatus 100 includes an image registrator 101, a patch extractor 103, a 2D transformer 105, a merger 107, a spatial denoiser 109, and a 2D inverse transformer and patch combiner 111.

The image registrator 101 includes an input 113 for receiving a signal $I_k$ and an output 115. The patch extractor 103 includes an input connected to the output 115 of the image registrator 101 and an output 117. The output 117 of the patch extractor 103 may output an M×M sized patch, where M is a rational number. The 2D transformer 105 includes an input connected to the output 117 of the patch extractor 103. The output 119 of the 2D transformer 105 may be frame w (e.g., $F_z(w)$) of the input signal. The merger 107 includes an input connected to the output 119 of the 2D transformer 105 and an output 121. The output 121 of the merger 107 may provide an intermediate estimate $\hat{R}(w)$ of size M×M. The spatial denoiser 109 includes an input connected to the output 121 of the merger 107 and an output 123. The output 123 of the spatial denoiser 109 may provide a post-processed estimate $\hat{R}(w)$ of size M×M. The 2D inverse transformer and patch combiner 111 includes an input connected to the output 123 of the spatial denoiser 109 and an output 125 outputting a multi-frame image denoised signal $\hat{I}_0$.

Image patches are selected by half overlap in each spatial dimension with size of M×M and filtered using a modified raised cosine window, ½−½ cos $(2\pi(x+½)/n)$ for x<n, and 0 otherwise. 2D-DFT is used as a 2D transformation. Frame 0 is selected as a reference frame. $\hat{R}(w)$ is obtained as in Equation (21) as follows:

$$\tilde{R}(w) = \frac{1}{N} \sum_{z=0}^{N-1} [F_z(w) + A_z(w)(F_0(w) - F_z(w))] = \quad (21)$$

$$\frac{1}{N} \sum_{z=0}^{N-1} \left[ F_z(w) + \frac{|D_z(w)|^2}{|D_z(w)|^2 + c\sigma^2} D_z(w) \right]$$

For a given frequency, $A_z(w)$ controls the degree to which z-th non-reference frame is merged into the final result versus falling back to the reference frame. Equation (21) can be rewritten as in Equation (22) as follows:

$$\tilde{R}(w) = \frac{1}{N} \sum_{z=0}^{N-1} [(1 - A_z(w))F_z(w) + A_z(w)F_0(w)] \quad (22)$$

The above pairwise temporal filter does not perform any spatial filtering. Thus, a spatial filtering is applied as a separate post-processing step in the 2D DFT domain. Spatial filtering is performed by applying a pointwise shrinkage operator. An additional noise shaping filter in the form of $\sigma=f(w)\sigma$ is also applied. The spatial filtering of robust merging is as in Equation (23) as follows:

$$\hat{F}_0(w) = \frac{|\tilde{F}(w)|^2}{|\tilde{F}(w)|^2 + c\frac{f(w)\sigma^2}{N}} \tilde{F}(w) \quad (23)$$

Figure 2:
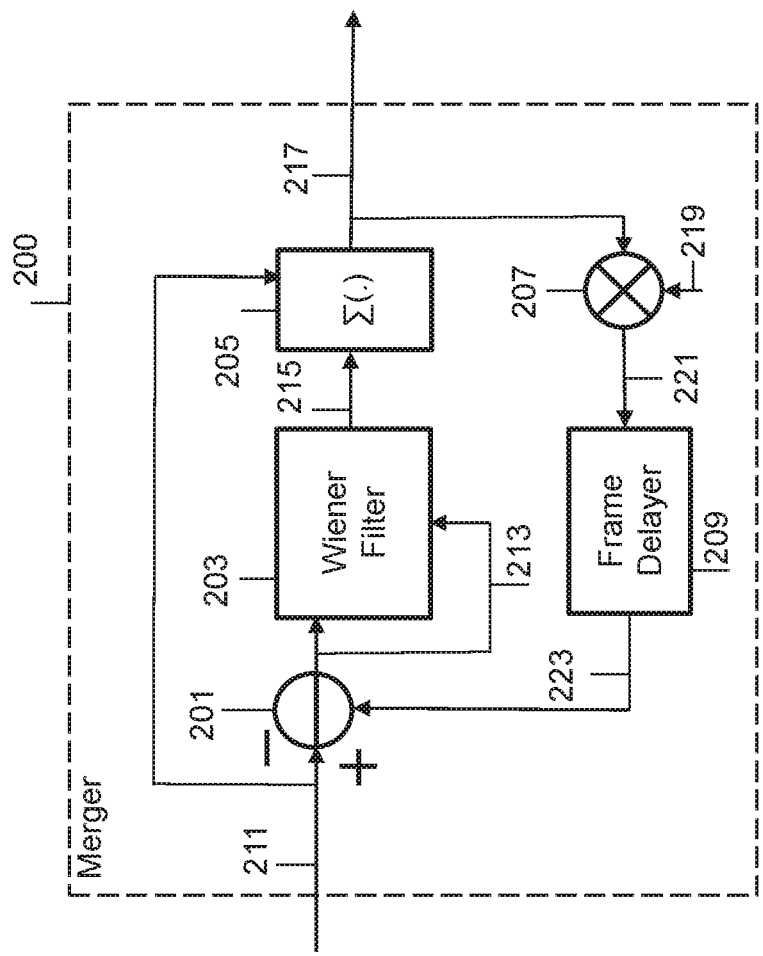
FIG. 2 is a block diagram of the merger of FIG. 1 for successive robust merging, according to one embodiment.

FIG. 2 is a block diagram of an exemplary apparatus for providing successive robust merging, according to one embodiment.

Referring to FIG. 2, the present apparatus includes a merger 200 having a subtractor 201, a Wiener filter 203, a summation function block 205, a multiplier 207, and a frame delayer 209.

The subtractor 201 includes a first input 211 for receiving $F_z(w)$, a second input connected to the output 223 of the frame delayer 209 for receiving $\hat{R}_z(w)$, and an output 213 for outputting $\hat{R}_z(w)-F_z(w)$. The Wiener filter 203 includes a first input connected to the output 213 of the subtractor 201, a second input connected to the output 213 of the subtractor 201, and an output 215. The summation function block 205 includes a first input connected to the output 215 of the Wiener filter 203, a second input 211 for receiving $F_z(w)$, and an output 217 for outputting $\hat{R}(w)$. The multiplier 207 includes a first input connected to the output 217 of the summation function block 205, a second input 219 for receiving 1/z, and an output 221. The frame delayer 209 includes an input connected to the output 221 of the multiplier 207 and an output 223 for outputting $\hat{R}_z(w)$.

The goal of merging is to reject merging of an non-reference frame whenever a difference between a corresponding non-reference frame and a reference frame cannot be related to noise.

However, after merging z frames we have access to $\hat{R}_z$ as an estimate of R. Therefore, $\hat{R}_z$ can be used in determining merging level of $F_z$, assuming that $\hat{R}_z$ experiences noise level of $$\frac{\sigma^2}{z}.$$

This scheme is referred to as successive robust merging, which can be formulated as in Equation (24) as follows:

$$\hat{R}_{z+1}(w) = \begin{cases} F_0(w) & z=0 \\ \frac{1}{z+1} \sum_{m=0}^{z} F_m(w) + \frac{|D_m^S(w)|^2}{|D_m^S(w)|^2 + c\frac{\sigma^2\left(1+\frac{1}{m}\right)}{2}} D_m^S(w) & z \geq 1 \end{cases} \quad (24)$$

where $D_m^s(w)=\hat{R}_m(w)-F_m(w)$, which may be equivalently formulated as in Equation (25) as follows:

$$\hat{R}_{z+1}(w) = \begin{cases} F_0(w) & z=0 \\ \frac{1}{z+1}\left(z\hat{R}_z(w) + \frac{|D_z^S(w)|^2}{|D_m^S(w)|^2 + c\frac{\sigma^2\left(1+\frac{1}{z}\right)}{2}} D_z^S(w)\right) & z \geq 1 \end{cases} \quad (25)$$

Figure 3:
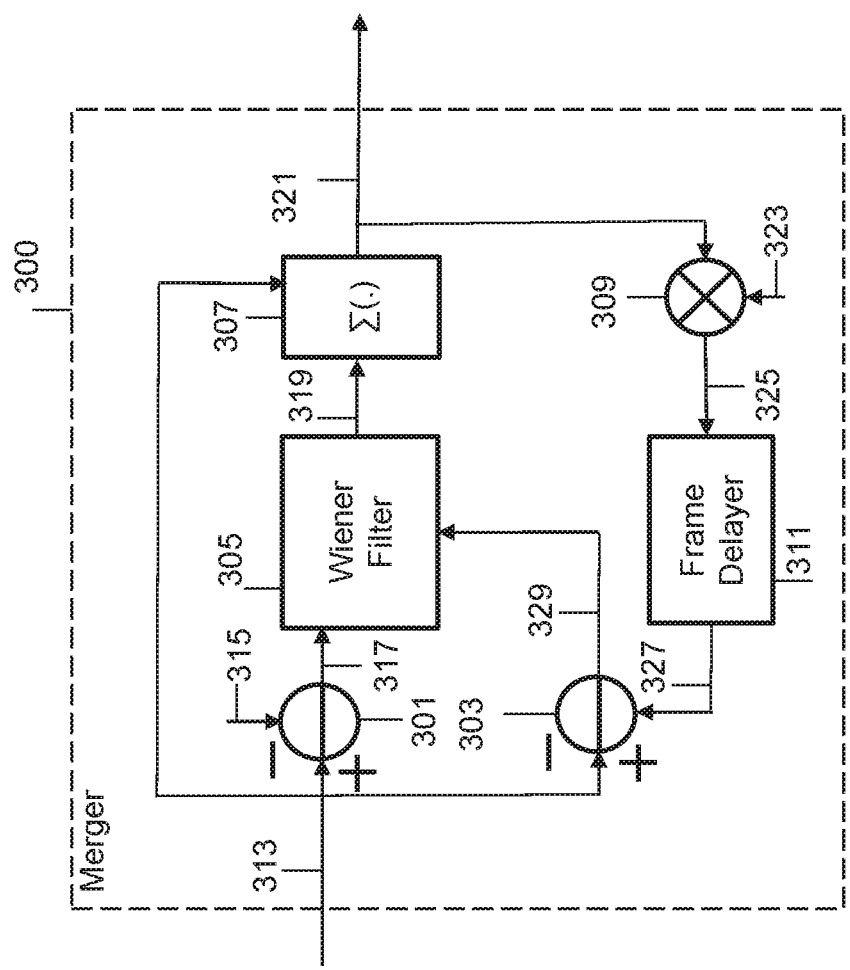
FIG. 3 is a block diagram of the merger of FIG. 1 for difference successive robust merging, according to one embodiment.

FIG. 3 is a block diagram of an exemplary apparatus for providing difference successive robust merging, according to one embodiment.

Referring to FIG. 3, the present apparatus includes a merger 300 having a first subtractor 301, a second subtractor 303, a Wiener filter 305, a summation function block 307, a multiplier 309, and a frame delayer 311.

The first subtractor 301 includes a first input 313 for receiving $F_z(w)$, a second input 315 for receiving $F_0(w)$, and an output 317 for outputting $F_0(w)-F_z(w)$. The second subtractor 303 includes a first input 313 for receiving $F_z(w)$, a second input connected to an output 325 of the frame delayer 311 for receiving $\hat{R}_z(w)$, and an output 329 for outputting $\hat{R}_z(w)-F_z(w)$. The Wiener filter 305 includes a first input connected to the output 317 of the first subtractor 301, a second input connected to the output 329 of the second subtractor 303, and an output 319. The summation function block 307 includes a first input connected to the output 319 of the Wiener filter 305, a second input 313 for receiving $F_z(w)$, and an output 321 for outputting $\hat{R}(w)$. The multiplier 309 includes a first input connected to the output 321 of the summation function block 307, a second input 323 for receiving 1/z, and an output 325. The frame delayer 311 includes an input connected to the output 325 of the multiplier 309 and an output 327 for outputting $\hat{R}_z(w)$.

$\hat{R}_z(w)$ may be used for updating filtering weights and may be formulated as in Equation (26) as follows:

$$\hat{R}_{z+1}(w) = \quad (26)$$

$$\begin{cases} F_0(w) & z=0 \\ \frac{1}{z+1} \sum_{m=0}^{z} \left[ F_m(w) + \frac{|D_m^S(w)|^2}{|D_m^S(w)|^2 + c\frac{\sigma^2\left(1+\frac{1}{m}\right)}{2}} D_m(w) \right] & z \geq 1 \end{cases}$$

where $D_m^S(w)=\hat{R}_m(w)-F_m(w)$ and $D_m(w)=F_0(w)-F_m(w)$ and where Equation (26) above may be equivalently formulated as Equation (27) as follows:

$$\hat{R}_{z+1}(w) = \begin{cases} F_0(w) & z=0 \\ \frac{1}{z+1}\left(z\hat{R}_z(w) + \frac{|D_m^S(w)|^2}{|D_m^S(w)|^2 + c\frac{\sigma^2\left(1+\frac{1}{m}\right)}{2}}D_z(w)\right) & z \geq 1 \end{cases} \quad (27)$$

Figure 4:
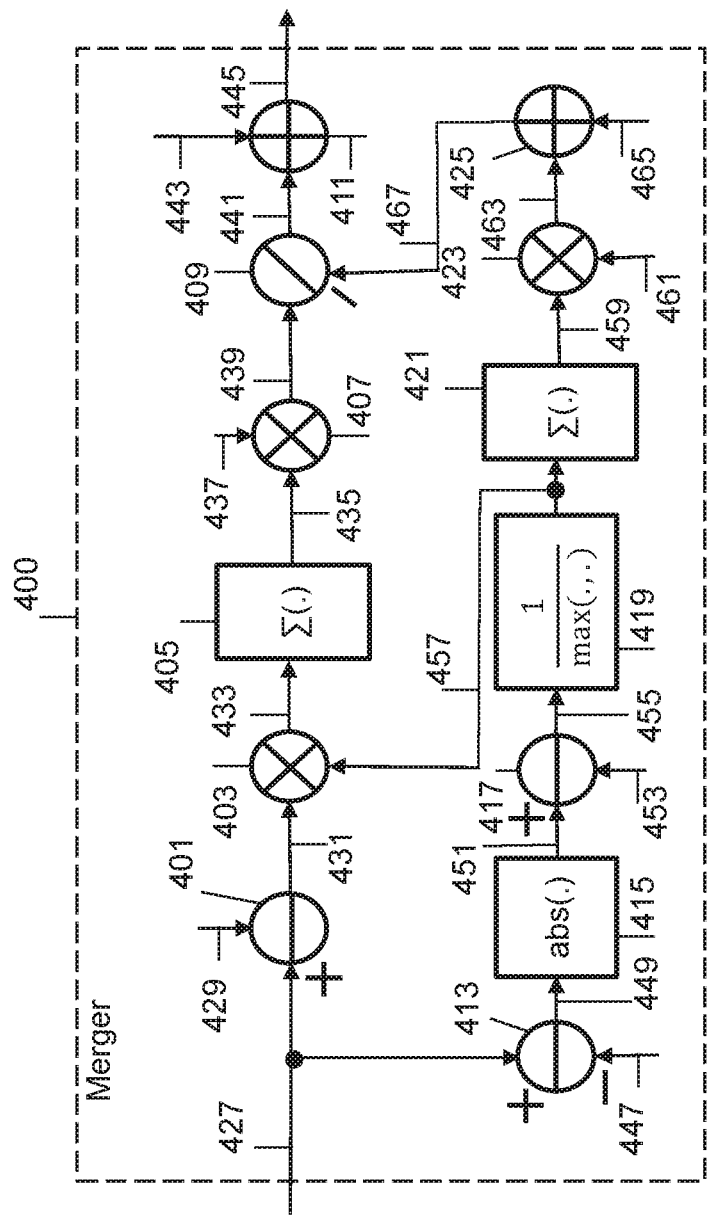
FIG. 4 is a block diagram of the merger of FIG. 1 for minimum mean square error (MMSE) merging, according to one embodiment.

FIG. 4 is a block diagram of a merger 300 for minimum mean square error (MMSE) merging, according to one embodiment.

Referring to FIG. 4, the merger 300 includes a first subtractor 401, a first multiplier 403, a first summation function block 405, a second multiplier 407, a divider 409, a first adder 411, a second subtractor 413, an absolute value function block 415, a third subtractor 417, a maximum value divider 419, a second summation function block 421, a third multiplier 423, and a second adder 425.

The first subtractor 401 includes a first input 427 for receiving $F_z(w)$, a second input 429 for receiving $\mu(w)$, and an output 431 for outputting $\mu(w)-F_z(w)$. The first multiplier 403 includes a first input connected to the output 431 of the first subtractor 401, a second input connected to an output 457 of the maximum value divider 419 for receiving filter weights, and an output 433. The first summation function block 405 includes an input connected to the output 433 of the first multiplier 403, and an output 435. The second multiplier 407 includes a first input connected to the output 435 of the first summation function block 407, a second input 437 for receiving P(w), and an output 439. The divider 409 includes a first input connected to the output 439 of the second multiplier 407, a second input connected to an output 467 of the second adder 425, and an output 441. The first adder 411 includes a first input connected to the output 441 of the divider 409, a second input 443 for receiving $\mu(w)$, and an output 445. The second subtractor 413 includes a first input 427 for receiving $F_z(w)$, a second input 447 for receiving $F_0(w)$, and an output 449 for outputting $F_k(w)-F_0(w)$. The absolute value function block 415 includes an input connected to the output 449 of the second subtractor 413 and an output 451. The third subtractor 417 includes a first input connected to the output 451 of the absolute value function block 415, a second input 453 for receiving $\sigma_0^z$, and an output 455. The maximum value divider function block 419 includes an input connected to the output 455 of the third subtractor 417 and an output 457 for outputting filter weights. The second summation function block 421 includes an input connected to the output 457 of the maximum value divider 419, and an output 459. The third multiplier 423 includes a first input connected to the output 459 of the second summation function block 421, a second input 461 for receiving P(w), and an output 463. The second adder 425 includes a first input connected to the output 463 of the third multiplier 423, a second input 465 for receiving a value 1, and an output 467.

R may be a true signal (e.g., an original noise free image of a scene), where $F_0(w)$ is a noisy reference frame and $e_z(w)$ is an alignment error at a z-th frame with respect to the reference frame, i.e., $e_0(w)=0$. For a noisy and potentially misaligned block of the z-th non-reference frame $F_z(w)$, Equation (28) is a follows:

$$F_z(w)=R(w)+e_z(w)+N_z(w) \quad (28)$$

where R is the true image and $N_z(w)$ is i.i.d. zero mean Gaussian noise with variance $\sigma_z^2$. Thus, $F_0(w)=R(w)+N_0(w)$.

The merging solution may be considered as an estimation problem with the goal of estimating the image R out of N observations $F_z(w)$'s. By assuming $e_0(w)=0$, frame $F_0$ acts as the reference frame. Considering a burst of N frames, and for a given spatial frequency w, a vector $F(w)=[F_0(w), F_1(w), \ldots, F_{N-1}(w)]^T$ may be formulated as in Equation (29) as follows:

$$F(w) = \begin{bmatrix} F_0(w) \\ F_1(w) \\ \vdots \\ F_{N-1}(w) \end{bmatrix} = \begin{bmatrix} 1 \\ 1 \\ \vdots \\ 1 \end{bmatrix} R(w) + \begin{bmatrix} 0 \\ e_1(w) \\ \vdots \\ e_{N-1}(w) \end{bmatrix} + N(w) \quad (29)$$

If $\mu(w)=E\{R(w)\}$ and P(w) is a true image power at spatial frequency w, i.e., $P(w)=E\{|R(w)-\mu(w)|^2\}$ and $e_z(w)$'s are i.i.d Gaussian variables with $E\{e_z(w)\}=0$, for MMSE estimation of R(w), Equation (30) is as follows:

$$\hat{R}(w) = \mu(w) + P(w)[1\ 1\ \ldots\ 1] \quad (30)$$

$$\left(P(w)\begin{bmatrix}1\\1\\\vdots\\1\end{bmatrix}[1\ 1\ \ldots\ 1] + \begin{bmatrix} \sigma_0^2 & 0 & \ldots & 0 \\ 0 & \sigma_1^2+E\{|e_1(w)|^2\} & \ldots & 0 \\ \vdots & \vdots & \ddots & \vdots \\ 0 & 0 & \ldots & \sigma_{N-1}^2+E\{|e_{N-1}(w)|^2\} \end{bmatrix}\right)^{-1}$$

$$(F(w)-\mu(w)1_N)$$

Equation (30) above may be formulated as Equation (31) as follows:

$$\hat{R}_{MMSE}(w) = \mu(w) + \frac{1}{1+\sum_{z=0}^{N-1}\frac{P(w)}{\sigma_z^2+E\{|e_z(w)|^2\}}}\sum_{z=0}^{N-1}\frac{P(w)}{\sigma_z^2+E\{|e_z(w)|^2\}}(F_z(w)-\mu(w)) \quad (31)$$

To obtain the MMSE results, $\sigma_z^2+E\{|e_z(w)|^2\}$ and P(w) are required, which are unknown. For $\sigma_z^2+E\{|e_z(w)|^2\}$, the instantaneous power is as in Equation (32) as follows:

$$E\{|e_z(w)|^2\}+\sigma_z^2=\sigma_z^2+\max(0,|F_z(w)-F_0(w)|^2-\sigma_0^2-\sigma_z^2) \quad (32)$$

Since multiple frames are available, P(w) is calculated from Equation (33) as follows:

$$P(w) = \frac{1}{N} \sum_{z=0}^{N-1} \max(0, |F_z(w) - \mu(w)|^2 - (E\{|e_z(w)|^2\} + \sigma_z^2)) \quad (33)$$

Since $E\{\hat{R}(w)|R(w)\} \neq R(w)$, the MMSE merging estimate of R (w) is biased.

Figure 5:
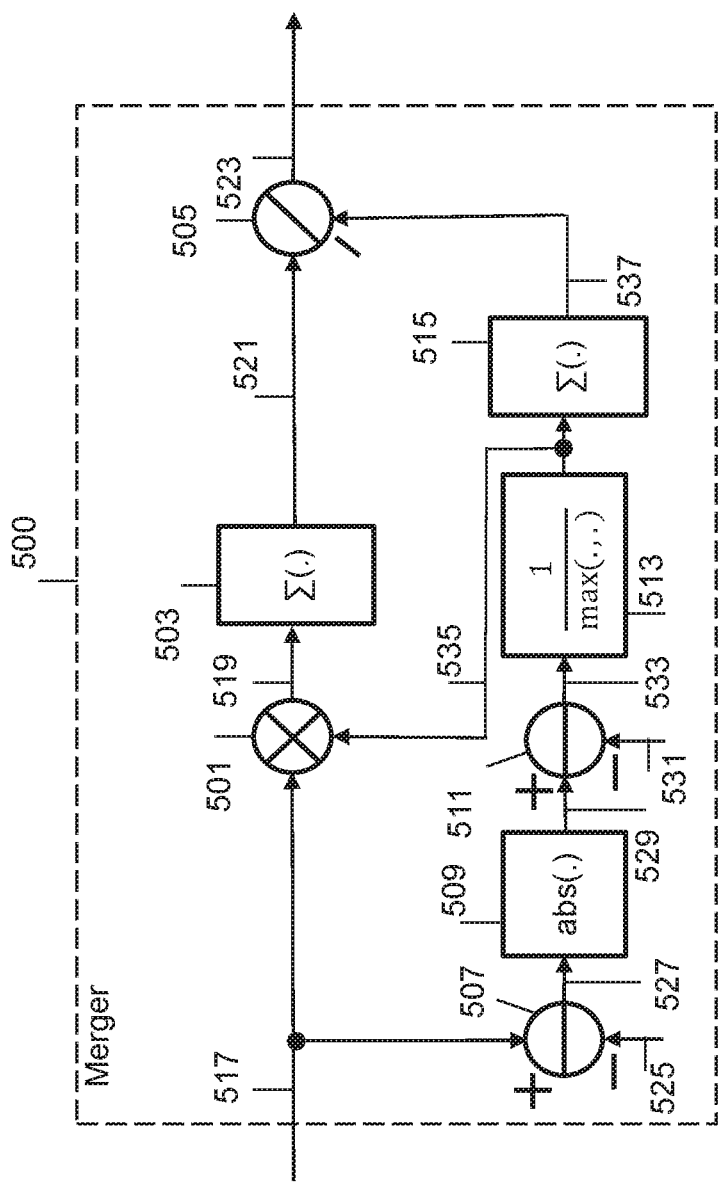
FIG. 5 is a block diagram of the merger of FIG. 1 for unbiased MMSE (U-MMSE) merging, according to one embodiment.

FIG. 5 is a block diagram of a merger 500 for U-MMSE merging, according to one embodiment.

Referring to FIG. 5, the merger 500 includes a multiplier 501, a first summation function block 503, a divider 505, a first subtractor 507, an absolute value function block 509, a second subtractor 511, a maximum value divider 513, and a second summation function block 515.

The multiplier 501 includes a first input 517 for receiving $F_z(w)$, a second input connected to an output 535 of the maximum value divider 513 for receiving filter weights, and an output 519. The first summation function block 503 includes an input connected to the output 519 of the multiplier 501, and an output 521. The divider 505 includes a first input connected to the output 521 of the first summation function block 503, a second input connected to an output 537 of the second summation function block 515, and an output 523. The first subtractor 507 includes a first input 517 for receiving $F_z(w)$, a second input 525 for receiving $F_0(w)$, and an output 527 for outputting $F_z(w)-F_0(w)$. The absolute value function block 509 includes an input connected to the output 527 of the first subtractor 507 and an output 531. The second subtractor 511 includes a first input connected to the output 531 of the absolute value function block 509, a second input 531 for receiving $\sigma_0^2$, and an output 533. The maximum value divider function block 513 includes an input connected to the output 533 of the second subtractor 511 and an output 535 for outputting filter weights. The second summation function block 515 includes an input connected to the output 535 of the maximum value divider 513, and an output 537.

An unbiased MMSE estimate of R (w) is formulated in Equation (34) as follows:

$$\hat{R}_{UMMSE}(w) = \frac{1}{\sum_{z=0}^{N-1} \frac{1}{\sigma_z^2 + E\{|e_z(w)|^2\}}} \sum_{z=0}^{N-1} \frac{1}{\sigma_z^2 + E\{|e_z(w)|^2\}} F_z(w) \quad (34)$$

where only an estimate of $E\{|e_z(w)|^2\}+\sigma_z^2$ is needed to obtain $\hat{R}_{UMMSE}(w)$.

Figure 6:
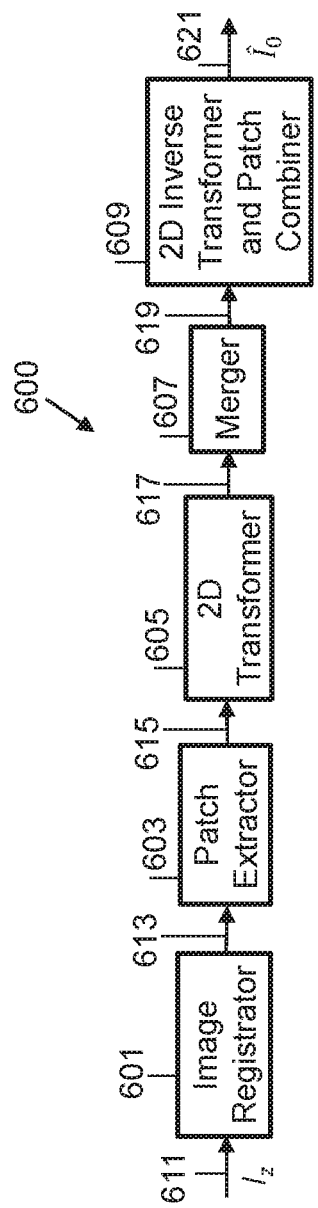
FIG. 6 is a block diagram of an apparatus for providing multi-frame denoising, according to one embodiment.

FIG. 6 is a block diagram of another exemplary apparatus for providing multi-frame image denoising, according to one embodiment.

Figure 7:
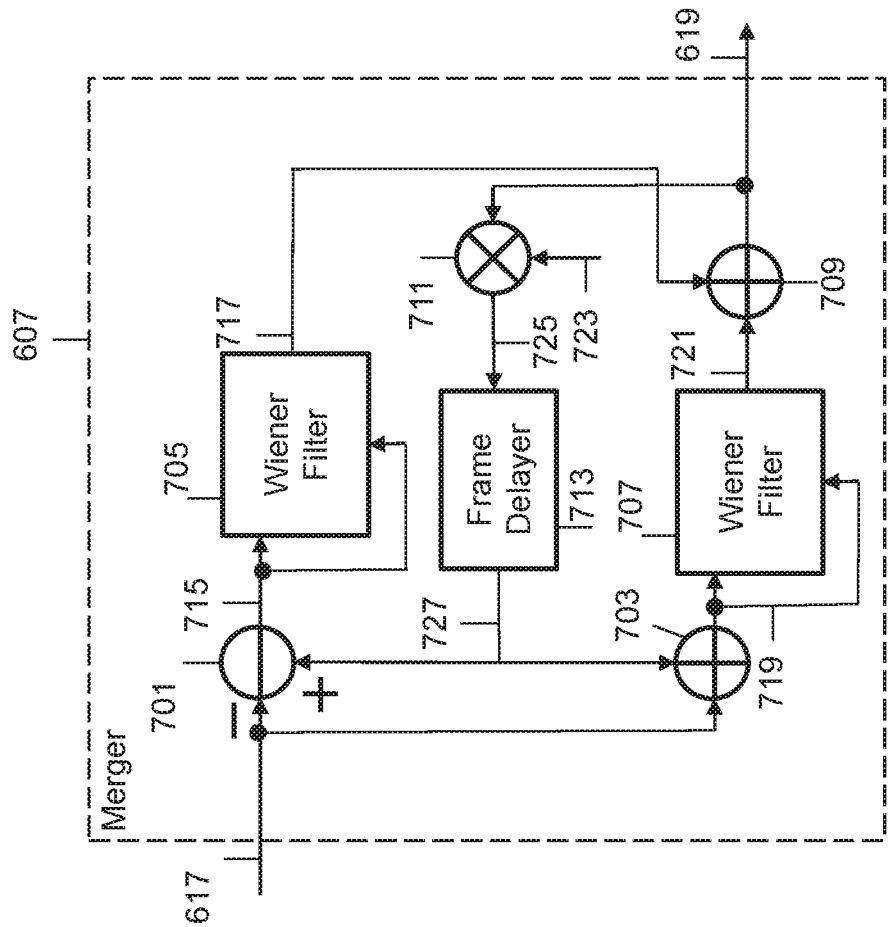
FIG. 7 is a block diagram of the merger of FIG. 6 for successive pairwise three dimensional (3D) merging, according to one embodiment.

Referring to FIG. 7, the apparatus 600 includes an image registrator 601, a patch extractor 603, a 2D transformer 605, a merger 607, and a 2D inverse transformer and patch combiner 609.

The image registrator 601 includes an input 611 for receiving a signal $I_k$ and an output 613. The patch extractor 603 includes an input connected to the output 613 of the image registrator 601 and an output 615. The 2D transformer 605 includes an input connected to the output 615 of the patch extractor 603. The merger 607 includes an input connected to the output 617 of the 2D transformer 605 and an output 619. The 2D inverse transformer and patch combiner 609 includes an input connected to the output 619 of the merger 607 and an output 621 outputting a multi-frame image denoised signal $\hat{I}_0$.

FIG. 7 is a block diagram of the merger 607 of FIG. 7 for successive pairwise 3D merging, according to one embodiment.

Figure 8:
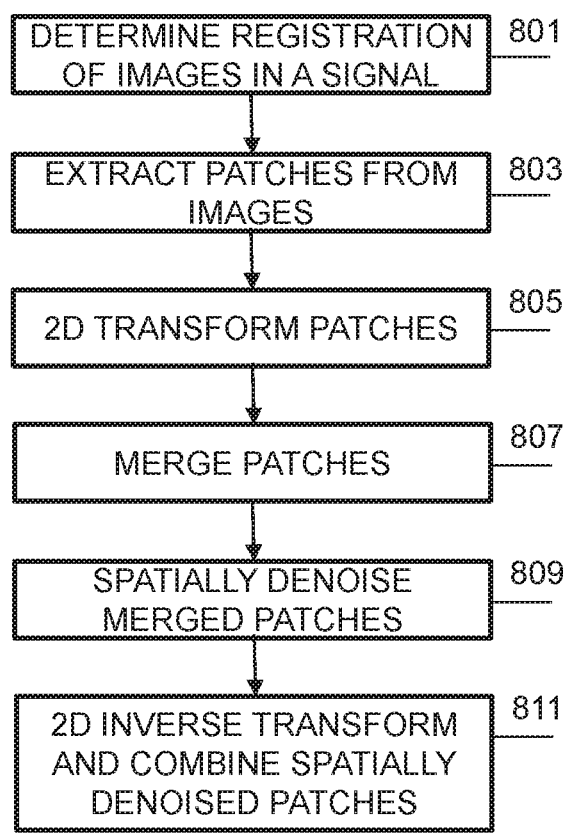
FIG. 8 is a flowchart of a method of multi-frame denoising, according to one embodiment.

Referring to FIG. 8, the merger 607 includes a subtractor 701, a first adder 703, a first Wiener filter 705, a second Wiener filter 707, a second adder 709, a multiplier 711, and a frame delayer 713.

The subtractor 701 includes a first input connected to the input 617 of the merger 607 for receiving $F_z(w)$, a second input connected to an output 727 of the frame delayer 713 for receiving $\hat{R}_z(w)$, and an output 715 for outputting $\hat{R}_z(w)-F_0(w)$. The first adder 703 includes a first input connected to the input 617 of the merger 607 for receiving $F_z(w)$, a second input connected to the output 727 of the frame delayer 713 for receiving $\hat{R}_z(w)$, and an output 719 for outputting $\hat{R}_z(w)+F_0(w)$. The second Wiener filter 707 includes a first input connected to the output 719 of the first adder 703, a second input connected to the output 719 of the first adder 703, and an output 721. The second adder 709 includes a first input connected to the output 721 of the second Wiener filter 707, a second input connected to the output 717 of the first Wiener filter 705, and an output connected to the output 619 of the merger 607. The multiplier 711 includes a first input connected to the output 619 of the second adder 709, a second input 723 for receiving a value 0.5, and an output 725. The frame delayer 713 includes an input connected to the output 725 of the multiplier 711 and an output 727.

Non-reference frames are successively merged where each non-reference frame is merged with the most recent merge result and the merging is performed in transform domain using a two-step transformation. In a first step, a 2D transformation of a reference frame and non-reference frames are obtained. A second step transformation is a 2 point 1D-DFT in temporal direction over the pair of aligned frequency components of the most recent merge results and the available non-reference frame. The Wiener filtering is applied over the 3D transformation results, then it is converted back to 2D domain (simple 2 point inverse DFT) to update the most recent merge results. Merging is initialized with the reference frame. The successive pairwise merging scheme may be formulated as in Equations (35), (36), and (37) as follows:

$$\hat{R}_{z+1}(w) = \begin{cases} F_0(w) & z = 0 \\ \frac{1}{2}\begin{pmatrix} G_{z+1}^+(\hat{R}_z(w) + F_z(w)) + \\ G_{z+1}^-(\hat{R}_z(w) - F_z(w)) \end{pmatrix} & z \geq 1 \end{cases} \quad (35)$$

$$G_{z+1}^+(w) = \frac{|\hat{R}_z(w) + F_z(w)|^2}{|\hat{R}_z(w) + F_z(w)|^2 + c(\sigma_z^2 + \sigma^2)} \quad (36)$$

$$G_{z+1}^-(w) = \frac{|\hat{R}_z(w) - F_z(w)|^2}{|\hat{R}_z(w) - F_z(w)|^2 + c(\sigma_z^2 + \sigma^2)} \quad (37)$$

where $\sigma_{z+1}^2(w) = \frac{1}{4}[(G_z^+(w)+G_z^-(w))^2 \sigma_z^2(w) + (G_z^+(w)-G_z^+(w))^2 \sigma^2]$ with $\sigma_0^2 = \sigma^2$.

There is no further post spatial denoising over $\hat{R}(w)$, which is different from successive robust merging and difference successive robust merging, which each apply a post spatial denoising.

FIG. 8 is a flowchart of a method of multi-frame imaging denoising, according to one embodiment.

Referring to FIG. 8, the present system registration of images in a signal at 801.

At 803, the present system extracts patches from the images.

At 805, the present system 2D transforms the extracted patches as described above.

At 807, the present system merges the 2D transformed patches as described above. The method of merging may be one of successive robust merging, difference successive robust merging, MMSE merging, and U-MMSE merging, as described above.

At 809, the present system spatially denoises the merged patches.

At 811, the present system 2D inverse transforms and combines the spatially denoised patches.

Figure 9:
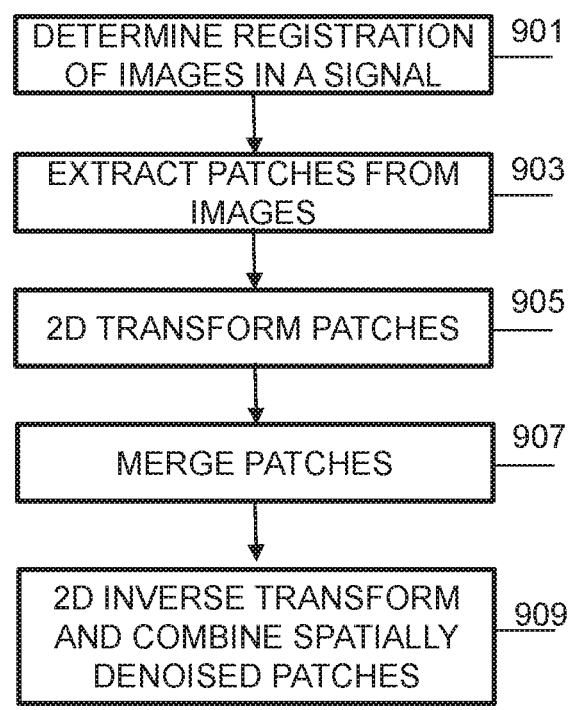
FIG. 9 is a flowchart of a method of multi-frame denoising, according to one embodiment.

FIG. 9 is a flowchart of a method of multi-frame imaging denoising, according to one embodiment.

Referring to FIG. 9, the present system determines registration of images in a signal at 901.

At 903, the present system extracts patches from the images.

At 905, the present system 2D transforms the extracted patches.

At 907, the present system merges the 2D transformed patches. The method of merging may be successive pairwise 3D merging.

At 909, the present system 2D inverse transforms and combines merged patches.

Figure 10:
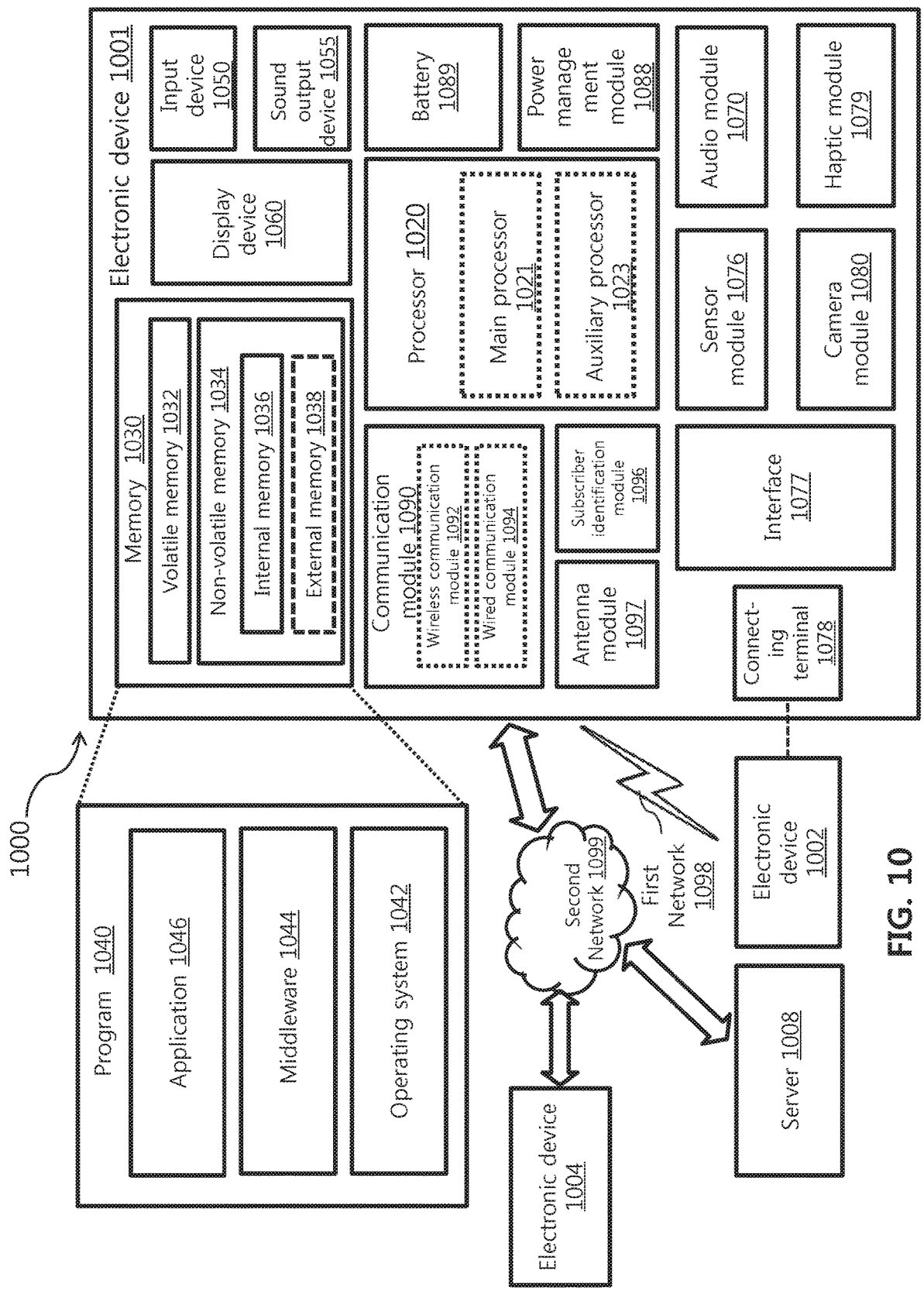
FIG. 10 is a block diagram of an electronic device in a network environment to which an apparatus and a method of the present disclosure is applied, according to one embodiment.

FIG. 10 is a block diagram of an electronic device in a network environment to which an apparatus and a method of the present disclosure is applied, according to one embodiment.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation.

According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021.

Additionally or non-referencely, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, e.g., a microphone, a mouse, a keyboard, or a digital pen (e.g., a stylus pen).

The sound output device 1055 may output sound signals to the outside of the electronic device 1001. The sound output device 1055 may include, e.g., a speaker or a receiver. The speaker may be used for general purposes, such as playing multimedia or playing record, and the receiver may be used for incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments of the present disclosure and the terms used herein are not intended to limit the technological features of present disclosure to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Terms such as "1$^{st}$" and "2nd" may be used to simply distinguish a corresponding component from another, and do not limit the components in other aspects (e.g., importance or order). If an element (e.g., a first element) is referred to, with or without the term "operatively" or "communicatively", as "coupled with," ", coupled to" "with connected," or "connected to" another element (e.g., a second element), the first element may be coupled with the second element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Non-referencely or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 11:
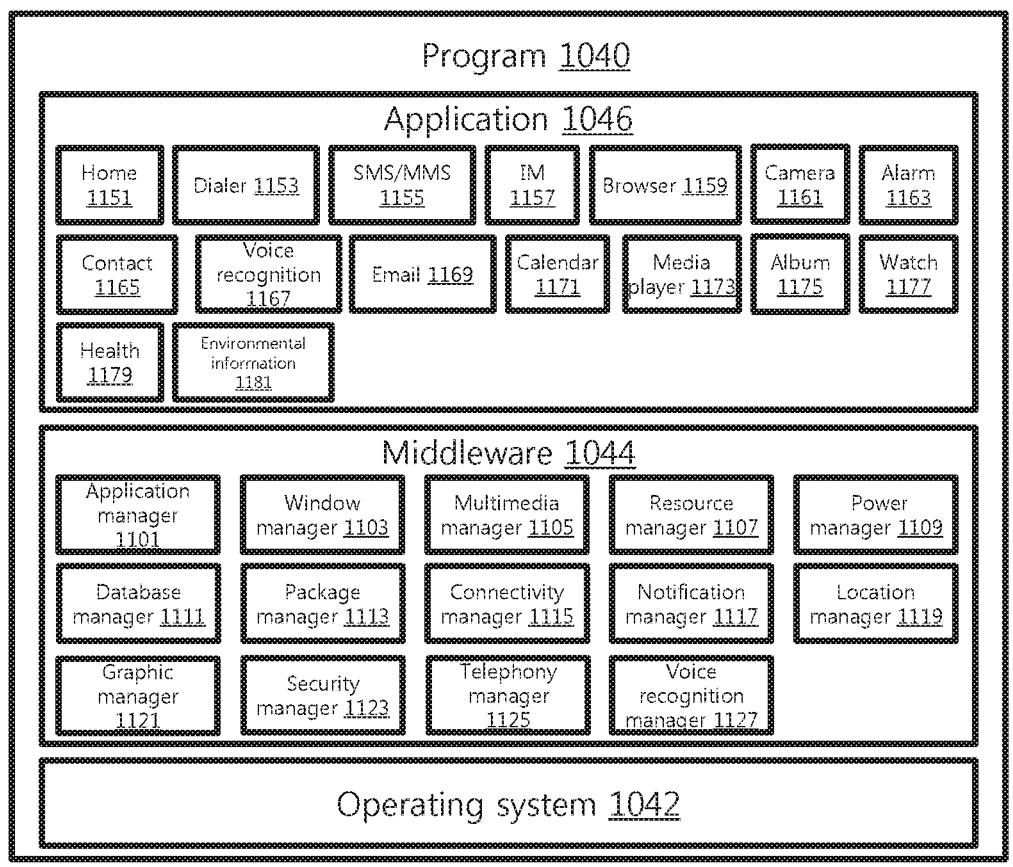
FIG. 11 is a block diagram of a program to which an apparatus and a method of the present disclosure is applied, according to one embodiment.

FIG. 11 is a block diagram of the program 1040 according to one embodiment.

Referring to FIG. 11, the program 1040 may include an OS 1042 to control one or more resources of the electronic device 1001, middleware 1044, or an application 1046 executable in the OS 1042. The OS 1042 may include, for example, Android®, iOS®, Windows®, Symbian®, Tizen®, or Bada™. At least part of the program 1040, for example, may be pre-loaded on the electronic device 1001 during manufacture, or may be downloaded from or updated by an external electronic device (e.g., the electronic device 1002 or 1004, or the server 1008) during use by a user.

The OS 1042 may control management (e.g., allocating or deallocation) of one or more system resources (e.g., process, memory, or power source) of the electronic device 1001. The OS 1042, additionally or non-referencely, may include one or more driver programs to drive other hardware devices of the electronic device 1001, for example, the input device 1050, the sound output device 1055, the display device 1060, the audio module 1070, the sensor module 1076, the interface 1077, the haptic module 1079, the camera module 1080, the power management module 1088, the battery 1089, the communication module 1090, the subscriber identification module 1096, or the antenna module 1097.

The middleware 1044 may provide various functions to the application 1046 such that a function or information provided from one or more resources of the electronic device 1001 may be used by the application 1046. The middleware 1044 may include, for example, an application manager 1101, a window manager 1103, a multimedia manager 1105, a resource manager 1107, a power manager 1109, a database manager 1111, a package manager 1113, a connectivity manager 1115, a notification manager 1117, a location manager 1119, a graphic manager 1121, a security manager 1123, a telephony manager 1125, or a voice recognition manager 1127.

The application manager 1101, for example, may manage the life cycle of the application 1046. The window manager 1103, for example, may manage one or more graphical user interface (GUI) resources that are used on a screen. The multimedia manager 1105, for example, may identify one or more formats to be used to play media files, and may encode or decode a corresponding one of the media files using a codec appropriate for a corresponding format selected from the one or more formats. The resource manager 1107, for example, may manage the source code of the application 1046 or a memory space of the memory 1030. The power manager 1109, for example, may manage the capacity, temperature, or power of the battery 1089, and determine or provide related information to be used for the operation of the electronic device 1001 based at least in part on corresponding information of the capacity, temperature, or power of the battery 1089. According to one embodiment, the power manager 1109 may interoperate with a basic input/output system (BIOS) of the electronic device 1001.

The database manager 1111, for example, may generate, search, or change a database to be used by the application 1046. The package manager 1113, for example, may manage installation or update of an application that is distributed in the form of a package file. The connectivity manager 1115, for example, may manage a wireless connection or a direct connection between the electronic device 1001 and the external electronic device. The notification manager 1117, for example, may provide a function to notify a user of an occurrence of a specified event (e.g., an incoming call, message, or alert). The location manager 1119, for example, may manage locational information on the electronic device 1001. The graphic manager 1121, for example, may manage one or more graphic effects to be offered to a user or a user interface related to the one or more graphic effects.

The security manager 1123, for example, may provide system security or user authentication. The telephony manager 1125, for example, may manage a voice call function or a video call function provided by the electronic device 1001. The voice recognition manager 1127, for example, may transmit a user's voice data to the server 1008, and receive, from the server 1008, a command corresponding to a function to be executed on the electronic device 1001 based at least in part on the voice data, or text data converted based at least in part on the voice data. According to one embodiment, the middleware 1044 may dynamically delete some existing components or add new components. According to one embodiment, at least part of the middleware 1044 may be included as part of the OS 1042 or may be implemented in other software separate from the OS 1042.

The application 1046 may include, for example, a home application 1151, a dialer application 1153, a short message service (SMS)/multimedia messaging service (MMS) application 1155, an instant message (IM) application 1157, a browser application 1159, a camera application 1161, an alarm application 1163, a contact application 1165, a voice recognition application 1167, an email application 1169, a calendar application 1171, a media player application 1173, an album application 1175, a watch application 1177, a health application 1179 (e.g., for measuring the degree of workout or biometric information, such as blood sugar), or an environmental information application 1181 (e.g., for measuring air pressure, humidity, or temperature information). According to one embodiment, the application 1046 may further include an information exchanging application that is capable of supporting information exchange between the electronic device 1001 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 1169) of the electronic device 1001 to the external electronic device. Additionally or non-referencely, the notification relay application may receive notification information from the external electronic device and provide the notification information to a user of the electronic device 1001.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or non-referencely, may support installation, delete, or update of an application running on the external electronic device.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
    a first subtractor including a first input to receive a frame of an image, a second input, and an output;
    a first Wiener filter including at least one input connected to the output of the first subtractor, and configured to filter the frame of the image and output a filtered frame;
    a summation function block or a first adder including a first input connected to an output of the first Wiener filter, a second input connected to the first input of the first subtractor or an output of a second Wiener filter, and an output;
    a multiplier including a first input connected to the output of the summation function block or the first adder, a second input for receiving a predetermined fractional value less than one, and an output; and
    a frame delayer including a first input connected to the output of the multiplier, and an output, and configured to feedback, to the first Wiener filter, an estimate of the image that is based on the filtered frame,
    wherein the second input of the subtractor is the output of the frame delayer or a reference frame, and
    wherein the first Wiener filter is further configured to filter each subsequent frame of the image based on a corresponding estimate of the image that is based on a previously filtered frame.

2. The apparatus of claim 1, further comprising:
    the first subtractor including the second input connected to the output of the frame delayer, and the output connected to a first input and a second input of the first Wiener filter;
    the summation function block including the second input connected to the first input of the first subtractor; and
    the multiplier including the first input connected to the output of the summation function block.

3. The apparatus of claim 2, further comprising:
an image registrator including an input and an output;
a patch extractor including an input connected to the output of the image registrator and an output;
a two dimensional (2D) transformer including an input connected to the output of the patch extractor and an output connected to the first input of the first subtractor;
a spatial denoiser including an input connected to the output of the summation function block and an output; and
a 2D inverse transformer and patch combiner including an input connected to the output of the spatial denoiser and an output.

4. The apparatus of claim 1, further comprising:
the first subtractor including the second input to receive the reference frame, and an output connected to a first input of the first Wiener filter;
the summation function block including the second input connected to the first input of the first subtractor; and
the multiplier including the first input connected to the output of the summation function block; and
a second subtractor including a first input connected to the output of the frame delayer, a second input connected to the first input of the first subtractor, and an output connected to a second input of the first Wiener filter.

5. The apparatus of claim 4, further comprising:
an image registrator including an input and an output;
a patch extractor including an input connected to the output of the image registrator and an output;
a two dimensional (2D) transformer including an input connected to the output of the patch extractor and an output connected to the first input of the first subtractor;
a spatial denoiser including an input connected to the output of the summation function block and an output; and
a 2D inverse transformer and patch combiner including an input connected to the output of the spatial denoiser and an output.

6. The apparatus of claim 1, further comprising:
the first subtractor including the second input connected to the output of the frame delayer, and the output connected to a first input and a second input of the first Wiener filter;
a second adder including a first input connected to the first input of the first subtractor, a second input connected to the output of the frame delayer, and an output;
the second Wiener filter including a first input and a second input connected to the output of the second adder, and an output;
the first adder including the second input connected to the output of the second Wiener filter; and
the multiplier including the first input connected to the output of the first adder.

7. The apparatus of claim 6, further comprising:
an image registrator including an input and an output;
a patch extractor including an input connected to the output of the image registrator and an output;
a two dimensional (2D) transformer including an input connected to the output of the patch extractor and an output connected to the first input of the first subtractor;
a spatial denoiser including an input connected to the output of the first adder and an output; and
a 2D inverse transformer and patch combiner including an input connected to the output of the spatial denoiser and an output.

8. A method, comprising:
subtracting, by a first subtractor, a first input of a frame of an image from a second input;
filtering, by a first Wiener filter, the frame of the image to output a filtered frame;
summing, by a summation function block or a first adder, an output of the first Weiner filter, and the first input of the subtractor or an output of a second Wiener filter;
multiplying, by a multiplier, a predetermined fractional value less than one and an output of the summation function block or the first adder;
inputting a result of the multiplication to a frame delayer;
feeding back, by the frame delayer, to the first Wiener filter, an estimate of the image that is based on the filtered frame; and
filtering, by the first Wiener filter, each subsequent frame of the image based on a corresponding estimate of the image that is based on a previously filtered frame,
wherein the second input of the first subtractor is an output of the frame delayer or a reference frame.

9. The method of claim 8, further comprising:
subtracting, by the first subtractor, the frame of the image from the output of the frame delayer,
wherein the summing comprises summing, by the summation function block, the output of the first Wiener filter and the first input of the first subtractor, and
wherein the multiplying comprises multiplying, by the multiplier, the output of the summation function block and the predetermined fractional value less than one.

10. The method of claim 9, further comprising:
determining, by an image registrator, a registration of images in a signal;
extracting, by a patch extractor, patches from the images;
transforming, by a two dimensional (2D) transformer, an output of the patch extractor;
spatially denoising, by a spatial denoiser, the output of the summation function block; and
transforming, by a 2D inverse transformer and patch combiner, the output of the spatial denoiser; and
combining, by the 2D inverse transformer and patch combiner, patches from an output of the 2D inverse transformer and patch combiner.

11. The method of claim 8, further comprising:
subtracting, by the first subtractor, the frame of the image from the reference frame,
wherein the summing comprises summing, by the summation function block, the output of the first Wiener filter and the frame of the image received by the first subtractor, and
wherein the multiplying comprises multiplying, by the multiplier, the output of the summation function block and the predetermined fractional value less than one;
subtracting, by a second subtractor, the frame of the image from the output of the frame delayer; and
providing an output of the second subtractor to the first Wiener filter.

12. The method of claim 11, further comprising:
determining, by an image registrator, a registration of images in a signal;
extracting, by a patch extractor, patches from the images;
transforming, by a two dimensional (2D) transformer, an output of the patch extractor;
providing the output of 2D transformer to the first subtractor;
spatially denoising, by a spatial denoiser, the output of the summation function block;
transforming, by a 2D inverse transformer and patch combiner, the output of the spatial denoiser; and combining, by the 2D inverse transformer and patch combiner, patches from an output of the 2D inverse transformer and patch combiner.

13. The method of claim 8, further comprising:
subtracting, by a first subtractor, the frame of the image from the output of the frame delayer;
providing a result of the subtraction to the first Wiener filter;
adding, by a second adder, the frame of the image and the output of the frame delayer;
filtering, by the second Wiener filter, the output of the second adder;
wherein the summing comprises adding, by the first adder, the output of the first Wiener filter and the output of the second Wiener filter, and
wherein the multiplying comprises multiplying, by the multiplier, the output of the first adder and the predetermined fractional value less than one.

14. The method of claim 13, further comprising:
determining, by an image registrator, a registration of images in a signal;
extracting, by a patch extractor, patches from the images;
transforming, by a two dimensional (2D) transformer, an output of the patch extractor;
providing an output of the 2D transformer to the first subtractor;
spatially denoising, by a spatial denoiser, the output of the first adder;
transforming, by a 2D inverse transformer and patch combiner, an output of the spatial denoiser; and
combining, by the 2D inverse transformer and patch combiner, patches from an output of the 2D inverse transformer and patch combiner.

\* \* \* \* \*